US 6,728,363 B2

(12) United States Patent
Lieberman et al.

(10) Patent No.: US 6,728,363 B2
(45) Date of Patent: Apr. 27, 2004

(54) DETERMINING EXPECTED CALL WAITING TIME IN A CALL CENTER QUEUE

(75) Inventors: Robert W. Lieberman, Thornhill (CA); Thien Vo-Dai, Toronto (CA)

(73) Assignee: Nortel Networks Limited, St. Laurent ( * ) Notice: Subject to any disclaimer, the term of this patent is extended or adjusted under 35 U.S.C. 154(b) by 78 days.

(21) Appl. No.: 09/751,448

(22) Filed: Dec. 29, 2000

(65) Prior Publication Data

US 2002/0114442 A1 Aug. 22, 2002

(51) Int. Cl.[7] .......................... H04M 3/00; H04M 5/00; H04M 1/64; H04M 11/06
(52) U.S. Cl. .......................... 379/266.06; 379/266.07; 379/67.1; 370/44
(58) Field of Search .................... 379/67.1, 88.09, 379/266.08, 266.07; 370/414, 44

(56) References Cited

U.S. PATENT DOCUMENTS 5,214,688 A * 5/1993 Szlam et al. ............... 379/67.1
RE36,416 E * 11/1999 Szlam et al. ............. 379/88.09
6,157,655 A * 12/2000 Shtivelman ................ 370/412
6,449,358 B1 * 9/2002 Anisimov et al. ...... 379/266.07

* cited by examiner

Primary Examiner—Ahmad F. Matar
Assistant Examiner—Thjuan P Knowlin
(74) Attorney, Agent, or Firm—Ken Bolrin; James Harrison; Bruce Garlick

(57) ABSTRACT

The estimated call waiting time process uses sampling statistics gathered over a moving window to determine the expected call wait time for each particular call into a call center. The window size is dynamically changed based on sampling theory and changes to call arrival rates and agent availability.

22 Claims, 4 Drawing Sheets

DETERMINING EXPECTED CALL WAITING TIME IN A CALL CENTER QUEUE

BACKGROUND OF THE INVENTION

I. Field of the Invention

The present invention relates generally to call centers. Particularly, the present invention relates to determination of expected call waiting time for a caller.

II. Description of the Related Art

When a caller calls into a call center, they may be placed on hold for an indefinite period of time due to other calls in a queue or not enough employees to answer calls. A call center can be any location that has a number of agents to handle incoming calls such as a product help line, a sales center, or an information center.

Once placed in a main queue, the caller may be bounced to another queue after determining that there is a need for an employee with a different set of skills to assist the caller.

Most callers desire to know the length of time that they will be required to hold in order to be assisted. Sometimes, due to heavy call volume, the caller may be on hold for an extended period. If the caller hangs up and calls at another time, they will start over in the queue and still not know the call volume and whether their particular call will be answered soon.

Due to dynamic call traffic patterns and the variation in agent availability, it is difficult to accurately determine the length of time that the caller will be waiting on hold for an agent. There is a resulting unforeseen need for an accurate estimate of call center call wait time.

SUMMARY OF THE INVENTION

To overcome the shortcomings of the prior systems and their operations, the present invention encompasses a process for determining an estimated call waiting time for a call made to a call center. The call center may comprise a multitude of call queues, each assigned to a group of agents having a specific skill set. A call center server controls the switching of calls through a private branch exchange to the call queues.

The process determines an instantaneous call count of the calls in a queue. The number of calls served by the agent during a predetermined time (the call service rate) is then generated.

In the preferred embodiment, the predetermined time over which the number of calls serviced is counted is a dynamically sized sample window. The size of the window changes as the call traffic to the call center and the agent availability change.

The estimated call waiting time is generated by dividing the instantaneous call count by the call service rate. This time is announced to each caller.

DETAILED DESCRIPTION OF THE PREFERRED EMBODIMENT

The present invention provides callers to a call center with an accurate estimate of their wait time before being serviced by an agent. The process of the present invention uses moving a window sampling scheme to estimate the statistics necessary for the expected call waiting time determination. The window size is determined dynamically and adapts to changing traffic and agent availability.

Figure 1:
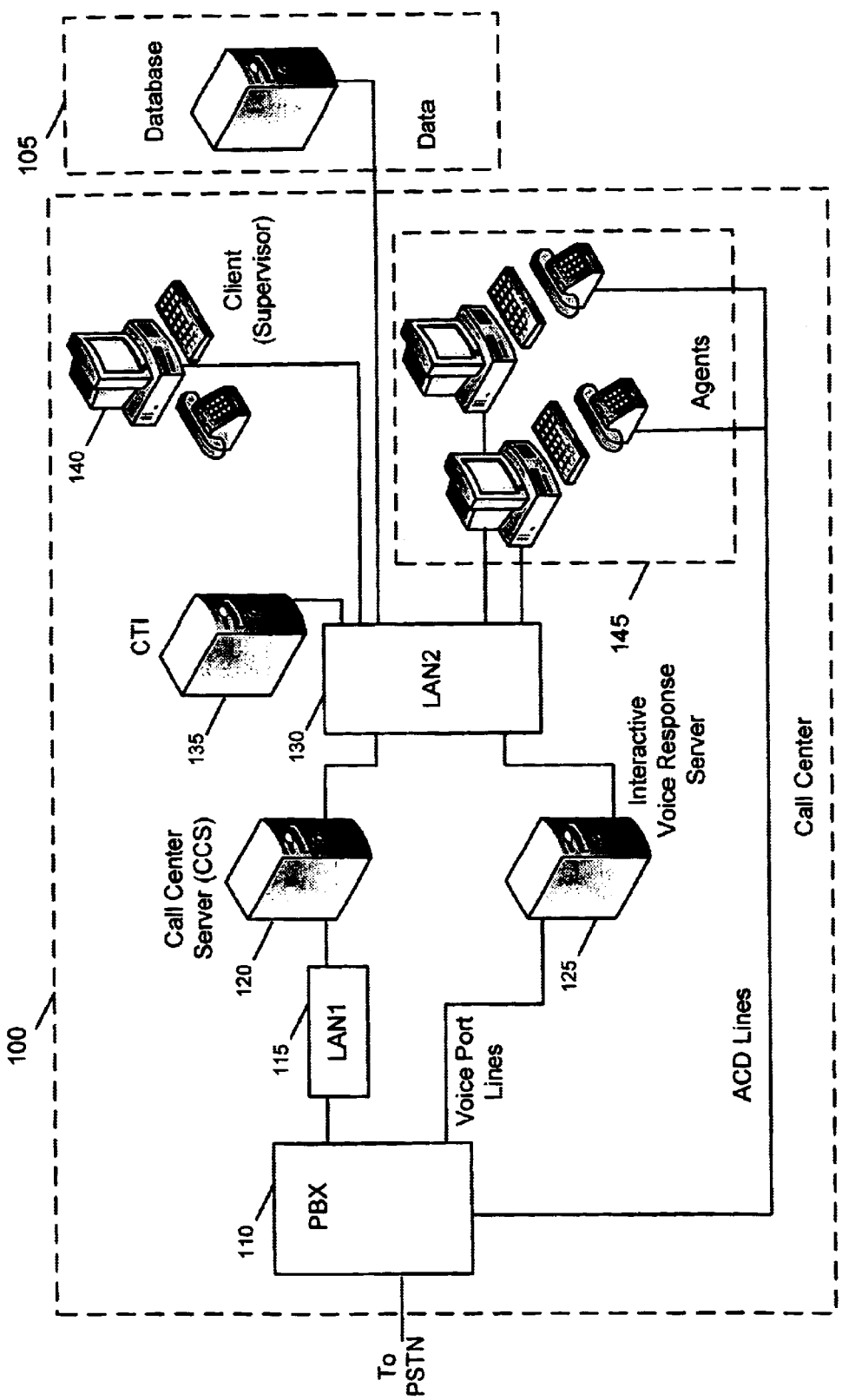
FIG. 1 shows a block diagram of a call center in accordance with the present invention.

A call center of the present invention is illustrated in FIG. 1. The call center (100) is comprised of a private branch exchange (PBX) (110) that is coupled to the public switched telephone network (PSTN). The PBX (110) is responsible for switching all of the calls coming in to the call center (100) to the appropriate locations within the center. Depending on the size of the call center, the PBX (110) may have to switch hundreds of calls for a small call center to tens of thousands for a large call center.

The PBX (110) has multiple control inputs that are used to instruct the PBX (110) on where to switch calls. One connection is to a call center server (CCS) (120). The CCS (120) is coupled to the PBX (110) through a first Local Area Network (LAN1) (115). LAN1 (115) is responsible for coupling the CCS (120) to the PBX (110).

The CCS (120) is responsible for executing the call processes of the present invention. The various processes executed by the CCS (120) determine to which agent an incoming call will be routed. Additionally, the CCS (120) processes determine how an incoming call will be treated (e.g., handled by a generic operator, sent to a certain skill set agent).

The PBX (110) is also coupled to an interactive voice response server (125) that interacts with the caller to determine the caller's needs. The interactive voice response server (125) is engaged in an interactive voice session with a caller under command of the PBX (110). The PBX (110) initiates the session at the request of the CCS (120). The PBX (110) is coupled to the interactive voice response server (125) through voice port lines.

The interactive voice response server (125) may ask the caller to speak or push a key in order to respond to the server's (125) queries. For example, if the call center (100) needs to know if the caller speaks only French, the interactive voice response server (125) generates a voice query asking the caller to speak "one" or depress the "1" key on the telephone keypad. The response from the caller is forwarded to the CCS to determine the agent skill sets for the caller.

LAN2 (130) serves as a communication channel between the CCS (120), the agents' terminals/workstations (145), the computer telephony integration (CTI) (135), the supervisor workstations (140), and the Database (105).

In the preferred embodiment, LANs are used to couple the CCS to the PBX and the agents to the CCS. Alternate embodiments use other forms of connections between the call center (100) entities. One embodiment uses wide area networks (WAN). Another embodiment uses direct connections using high-speed lines.

The CTI (135) represents various applications on a stand-alone server that integrates with the CCS functions to provide needed data. In one embodiment, the CTI (135) represents a customer database that is accessed when required by the CCS to display caller information on an agent's workstation.

The agents (145) are grouped into multiple skill sets. The agents (145) in FIG. 1 represent the telephones and terminals required by the agents to perform their tasks and interface with the rest of the call center (100). The agents are coupled to the PBX (110) over automatic call distribution lines.

In one embodiment, one group of agents handles incoming calls that are from French speaking callers. As another example, if the call center (100) is a computer service center, one group of agents (145) may have skills in diagnosing simple problems while another group of agents (145) are skilled technicians that will be connected only to the callers that have problems that cannot be solved by the less skilled agents.

The supervisor (140) can screen all calls as they progress in order to ensure the quality of service provided by the agents (140). The supervisor (140) may listen only or be able to break into a call in order to provide assistance.

The CCS and the CTI typically have access to a database (105). The database (105) may be physically located with the call center (100) or may be located in various locations away from the call center (100) and accessible over a network or the Internet.

The database (105) may contain information regarding the agents such as their skill sets and their supervisors. Alternate embodiments user the database for other data storage.

The call center (100) illustrated in FIG. 1 is only one embodiment of a call center. Alternate embodiments have other architectures that perform substantially the same tasks to service the caller.

Figure 2:
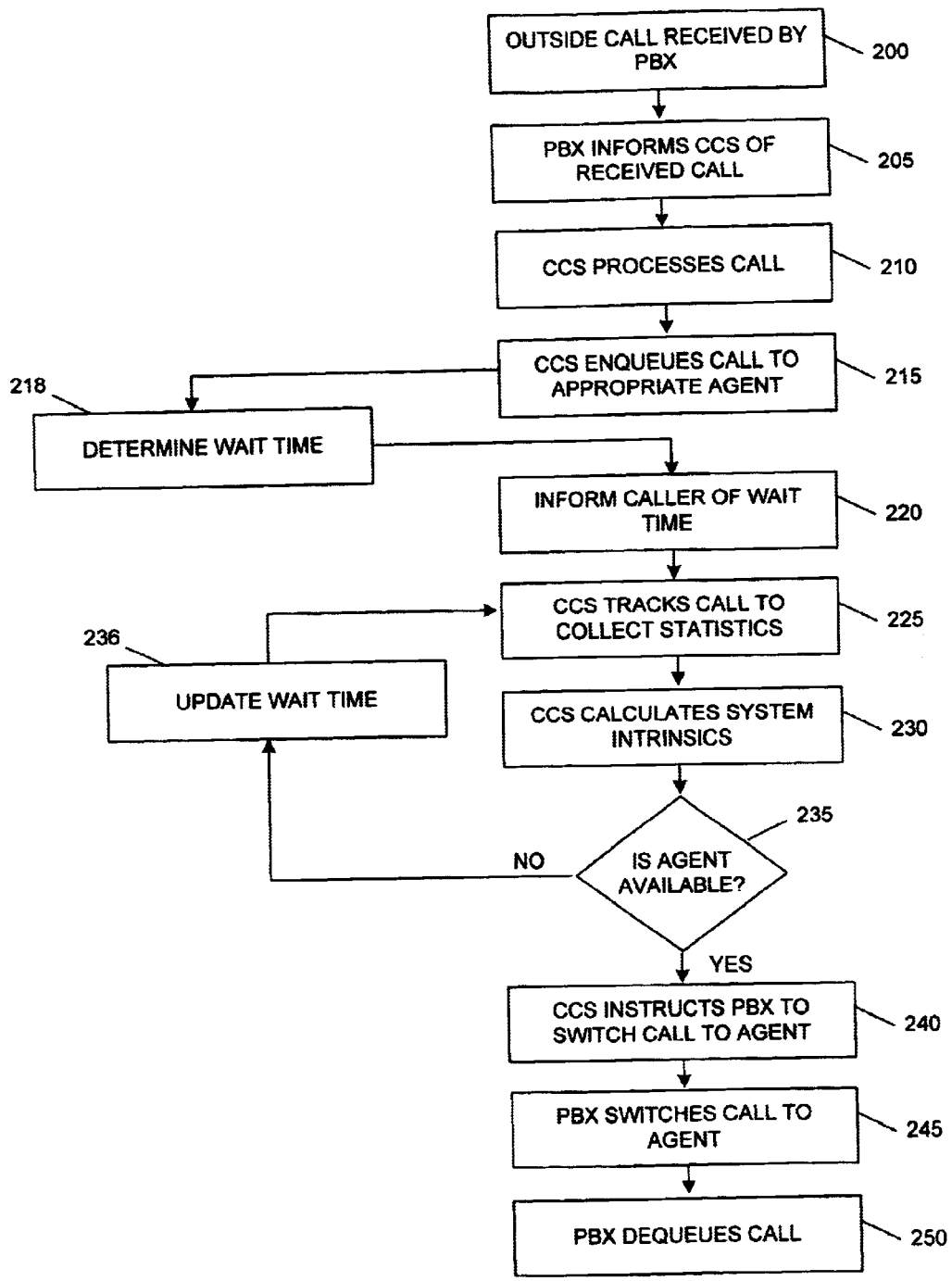
FIG. 2 shows a flowchart of the call center process of the present invention.

FIG. 2 illustrates a flowchart of a call center process of the present invention. This flowchart illustrates the preferred embodiment of a process the call center uses to service an incoming call.

The PBX first receives an outside call from the PSTN (step 200). The PBX then informs the CCS, through LAN1, that a call has been received (step 205).

The CCS processes the call by executing various scripts that provide treatment of the call (step 210). The CCS also attempts to find an available agent to whom the call can be forwarded. The skill set of the agent is determined as described above.

If an appropriate agent is available, CCS instructs the PBX to forward the call to that agent. If no appropriate agent is available, the CCS enqueues the call (step 215) with the agents of an appropriate skill set. The CCS, using the call wait time estimation process of the present invention, determines the wait time for the caller (step 218).

At this point, the caller is informed of the estimated wait time (step 220). The CCS then tracks the calls in the queue as part of collecting statistics (step 225). System intrinsics are calculated by the CCS using these statistics (step 230). The system intrinsics will be discussed subsequently in relation to generation of the estimated call waiting time.

When an agent is available (step 235), the CCS instructs the PBX to switch the call to the appropriate agent (step 240). The PBX then switches the call to the agent (step 245) and dequeues the call (step 250). After this, the call is considered to have entered service and the CCS processes no longer track it.

If an agent is not available (step 235), the wait time is updated (step 236). The process then returns to tracking the call to collect statistics (step 225).

The preferred embodiment process of the present invention for determining the expected waiting time (EWT1) is estimated by dividing an instantaneous queued call count (QCC) value by the call service rate (CSR). The EWT1 is expressed as follows:

$$EWT1 = QCC/CSR$$

The instantaneous QCC is determined by the CSS by keeping count of the number of queued calls for that particular agent skill set. The CSR is the number of callers handled collectively by the agents of the skill set per unit of time.

The CSR can be estimated as a mobile window average by determining the average waiting time (AWT) per waiting call in the window and the average queue length (AVQ) in the window.

The AWT is determined by the equation:

$$AWT = TCD/WCC$$

TCD is the total call delay that is the total waiting time of all calls that have to wait in a moving window. WCC is the waiting call count in a window (i.e., the cumulative number of calls, having a non-zero waiting time, that are used to calculate TCD).

From the AWT and the AVQ, the service rate, CSR, can be estimated by the equation:

$$CSR = AVQ/AWT$$

Combining the above equations, the equation for EWT1 becomes:

$$EWT1 = QCC/CSR$$
$$= (AWT/AVQ) * QCC$$
$$= (TCD/WCC) * (QCC/AVQ)$$

It should be noted that in the above equations, AVQ cannot be approximated as WCC since AVQ is an average value whereas WCC is a cumulative one. If the non-zero counts (NZC) of queue length obtained in a window yield ACQ as accumulated queue length, then:

$$AVQ = ACQ/NZC$$

Substituting AVQ into the above equation yields the process for determining the estimated call waiting time that can be expressed as:

$$EWT1 = TCD*(QCC*NZC)/(WCC*ACQ)$$

An alternate embodiment for determining the estimated call waiting time (EWT2) uses the expected queue length (EQL) and the incoming call rate (ICR). EWT2 is expressed as:

$$EWT2 = EQL/ICR$$

EQL is defined as the queue length that is expected instead of using the preferred embodiment's actual queue length. EQL includes a queue length of zero.

EQL is determined by the following process:

$$EQL = ACQ/NOS$$

ACQ was defined previously in the preferred embodiment process. NOS is the number of samples made in the moving window.

ICR is the incoming call rate. This is the number of calls entering the queue per unit of time. ICR can also be estimated as a moving window average.

ICR for the alternate embodiment equation can be estimated by the equation:

$$ICR=ICC/WSIZE$$

In this equation, ICC is the incoming call count in a moving window. WSIZE is the size of the moving window (i.e., the time units over which the calls are sampled).

By substituting the above equations, the process for determining EWT2 can be expressed as:

$$EWT2=WSIZE*(ACQ/(ICC*NOS))$$

processes for EWT1 and EWT2 can either be used when a call is not yet queued. However, when a call is already queued, only the preferred embodiment, EWT1, should be used but with the value for QCC replaced by the position of the call with respect to the head of the queue (i.e., the number of calls ahead of that particular call).

The processes of the present invention require a correct window size (WSIZE) in order to achieve accurate estimates. The window size should be large enough to include a significant number of call arrivals that have to wait in the queue. However, the window size should not be too large to be insensitive to traffic fluctuations. In fact, if the window size is too small, WCC may be equal to zero.

A process for determining a fixed window size in varying traffic conditions is not possible. The process of the present invention uses a dynamic window size to produce better results than a fixed window size approach.

The dynamic window size process uses a control strategy that maintains a predetermined number of windows in increasing size. For example, three windows, W1, W2, and W3 are used where W1=10 min., W2=15 min., and W3=20 min. More precisely, W1 is a subset of W2 and W2 is a subset of W3.

If samples are taken at one minute intervals, the last 20 samples must be tracked. At each sampling, the three cumulated values for the three windows are updated. The updated windows are represented as WCC1, WCC2, and WCC3. In this case, WCC1<WCC2<WCC3.

In order to get a good estimate of the mean call service rate, a threshold is fixed for the cumulated value on the number of call waiting counts to be observed. This threshold is designated as MIN calls. A value for MIN can be obtained using a standard formula statistical theory for sample size determination.

EWT1 can be represented by:

$$EWT1=WSIZE_j*(QCC/WCC_j),$$

In this process, j is the minimum value such that $WCC_j>MIN$.

When calculating EWT2, the smallest window from W1, W2, and W3 is chosen that has a call count that is greater than the minimal threshold. In other words, EWT2 is represented as:

$$EWT2=WSIZE_j*(ACQ_j/(ICC_j*NOS_j))$$

In this alternate embodiment process, j is the minimum value such that $ICC_j>MIN$ and $WSIZE_j$ is the size of the chosen window.

The processes of the present invention use three overlapping windows so that at least one of them would succeed in yielding a value greater than the threshold. If the largest window still yields a number of observations that is less than the pre-fixed threshold, it is necessary to use a default value for the expected waiting time or make do with any number obtained. In the preferred embodiment, a default value would be the last expected call waiting time generated.

The number of windows and the window sizes that have been used are just an example for illustration purposes. In alternate embodiments, the number of windows and their sizes should be iteratively incremented between the minimum time interval (corresponding to high traffic conditions) and the maximum time interval (corresponding to low traffic conditions).

Figure 3:
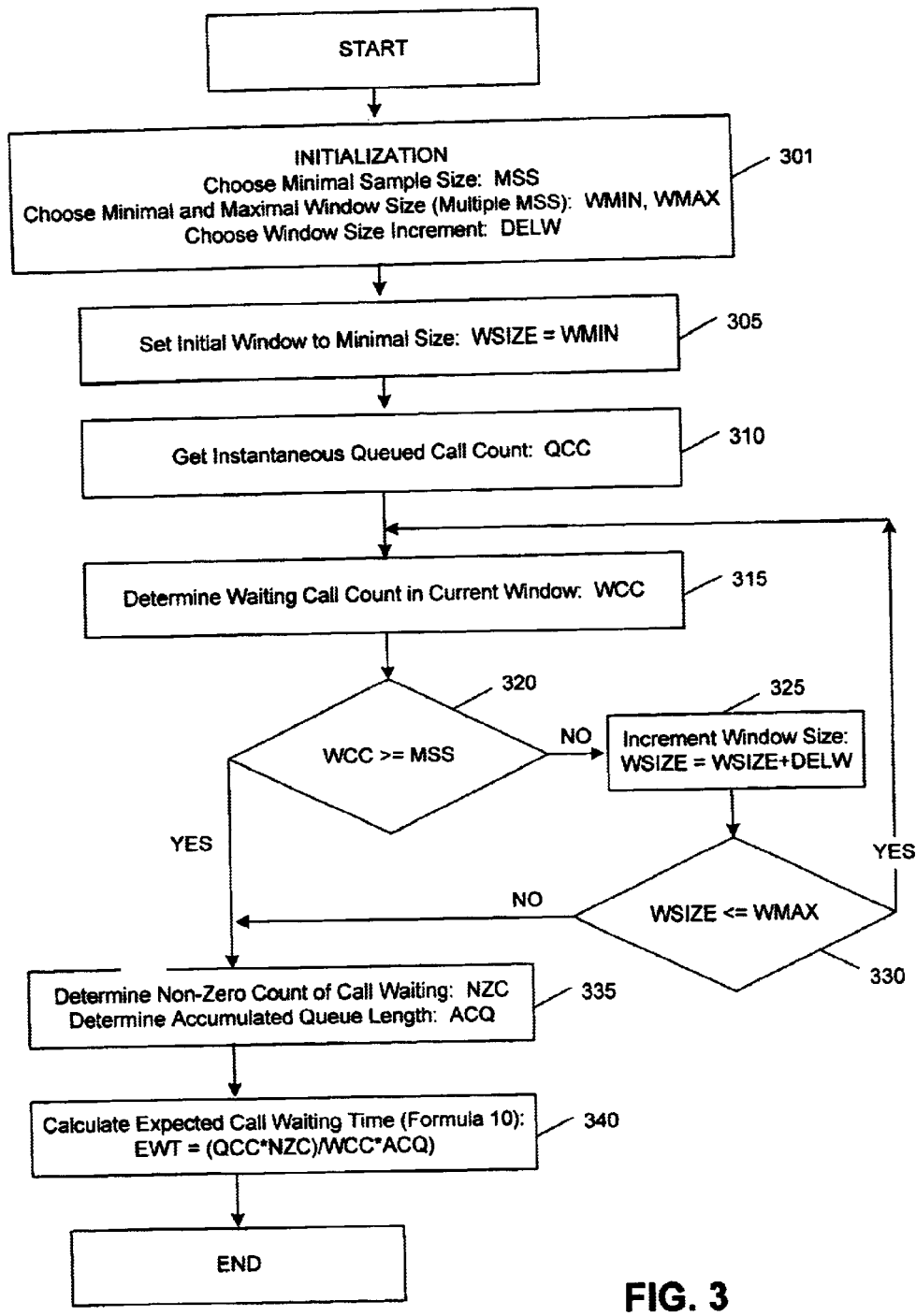
FIG. 3 shows a flowchart of the dynamic moving window time estimation process of the present invention.

A flowchart for determining the dynamic moving window of the expected call waiting time process of the present invention is illustrated in FIG. 3. The process starts with an initialization process (step 301).

The initialization process (step 301) is comprised of choosing a minimal sample size (MSS) in the moving window. MSS is the minimum number of calls that will be included in the window. Also during the initialization process (step 301) the minimum and maximum window sizes (WMIN and WMAX) are chosen. WMIN and WMAX are the minimum and maximum number, respectively, of sampling window size chosen such that there is a good chance that at least MSS calls are observed to have experienced non-zero waiting time in the window.

The window size increment (DELW) is also chosen during the initialization process (step 301). DELW is the value chosen by which to increment the window.

The initial window is set to a minimal size (WSIZE= WMIN) (step 305). The instantaneous queued call count (QCC) is determined (step 310) as is the waiting call count (WCC) in the current window (step 315).

If WCC is greater than or equal to MSS (step 320), the non-zero count of call waiting (NZC) is determined as is the accumulated queue length (ACQ) (step 335). These values are then used to calculate the EWT1 using the above described process and equations (step 340).

If WCC is less than MSS, the window size is incremented (WSIZE=WSIZE+DELW) (step 325). In this case, WSIZE is then compared to WMAX. If WSIZE is greater than WMAX (step 330), the non-zero count of call waiting (NZC) is determined as is the accumulated queue length (ACQ) (step 335). These values are then used to calculate the EWT1 using the above described process and equations (step 340). If WSIZE is less then or equal to WMAX (step 330), the process goes to step 315 and continues.

The two embodiments discussed above (EWT1 and EWT2) require the same type of system intrinsics for the estimation of the required parameters. EWT1 is based on the instantaneous queue length. EWT2 is based on an average value. EWT2 would yield a more representative estimate for the expected call waiting time. EWT1 can be used to estimate the expected remaining call waiting time given the position in the queue.

Figure 4:
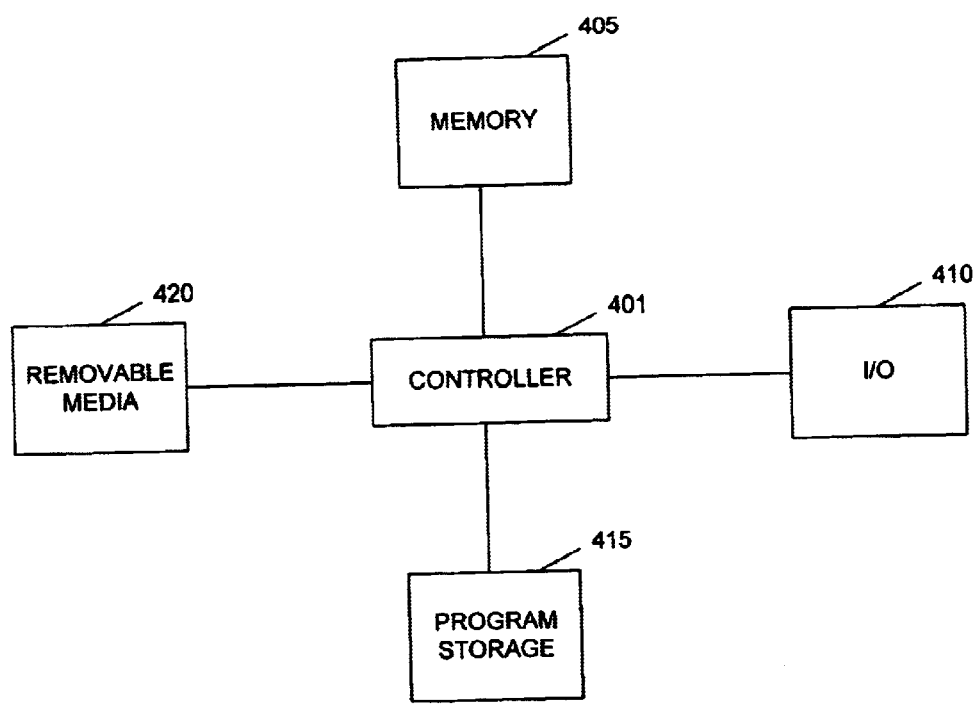
FIG. 4 shows a block diagram of a call center server of the present invention.

A block diagram of the call center server of the present invention is illustrated in FIG. 4. The server is comprised of a controller or microprocessor (401) for controlling the server. Memory (405), such as random access memory and read only memory, is used for temporary and/or permanent storage of data used by the controller (401).

Program storage (415), such as a hard drive, is used for permanent storage of programs and processes executed by the controller (401). Removable media such as floppy drives, CDROM drives, DVD ROM and RAM drives and other such removable memory is used to load programs and processes into the server. I/O (410) represents the keyboards, monitors, terminals, and other means for getting information into the server and for accessing the server manually.

In summary, the call center system and processes of the present invention provide an estimate of the expected call waiting time by using dynamically adaptive moving window sampling. This provides a more accurate estimate in response to fluctuating traffic patterns and agent/skill set reassignments.

Numerous modifications and variations of the present invention are possible in light of the above teachings. It is therefore to be understood that within the scope of the appended claims, the invention may be practiced otherwise than as specifically described herein.

What is claimed is:

1. A method for determining an estimated call waiting time for a call made to a call center and queued to a call queue assigned to agents assigned to a skill set, the method comprising the steps of:

determining an instantaneous call count in the call queue;

determining an agent service rate during a predetermined time by selecting a sample window size and by a number of callers processed within the selected sample window size;

determining whether to select a different window size based upon total call rate; and generating the estimated call waiting time in response to the instantaneous call count and the agent service rate during the predetermined time.

2. The method of step 1 wherein the step of generating the estimated call waiting time includes dividing the instantaneous call count by the number of calls served by the agents during the predetermined time.

3. The method of claim 1 wherein the step of determining the number of calls served by the agents during a predetermined time determines a call service rate and comprises the steps of:

dividing a total waiting time for all calls in the sample window by a total waiting call count in the sample window to generate an average waiting time per call in the sample window; and generating the call service rate by dividing an average queue length in the sample window by the average waiting time per call.

4. The method of claim 3 wherein the sample window comprises a dynamically changing number of samples.

5. The method of claim 1 wherein the step of determining a sample window comprises the steps of:

selecting a minimum sample size;

selecting a minimum sample window size;

selecting a maximum sample window size;

selecting a sample window increment value;

selecting an initial sample window size that is substantially equal to the minimum sample window size;

determining an instantaneous queued call count in response to the number of calls in the queue;

determining a waiting call count in the sample window;

if the waiting call count is less than the minimum sample size, incrementing the initial sample window size by the sample window increment value to generate an incremented sample window size;

if the incremented sample window size is greater than the maximum sample window size or the waiting call count is greater than the minimal sample count, determining a non-zero count of calls waiting and an accumulated queue length; and generating the expected call waiting time in response to the queued call count, the non-zero count of calls waiting, the waiting call count, and the accumulated queue length.

6. The method of claim 3 wherein the step of determining a sample window comprises the step of generating a plurality of sample windows, each having different sample quantities.

7. A method for determining an estimated call waiting time for a call made to a call center comprising a plurality of call queues, each call queue assigned to an agent for processing, the method comprising the steps of:

for a first call queue, generating a plurality of sample windows, each having a different size, over which call samples are taken;

varying the sizes of each of the plurality of sample windows in response to a change in frequency of calls made to the call center;

determining an instantaneous call count in the first call queue;

determining a call service rate for the agent, processing the first call queue, over each of the plurality of windows; and generating the estimated call waiting time in response to the instantaneous call count and the call service rate.

8. The method of claim 7 wherein the size of each sample window of the plurality of sample windows is smaller than a succeeding sample window of the plurality of sample windows.

9. The method of claim 7 wherein the size of each sample window is greater than zero.

10. A method for determining an estimated call waiting time for a call made to a call center and queued to a call queue assigned to an agent for processing, the method comprising the steps of:

generating a plurality of sample windows, each having a different size, over which call samples are taken;

varying the sizes of each of the plurality of sample windows in response to a change in frequency of calls made to the call center;

determining an expected queue length of the call queue;

determining an incoming call rate for the agent, processing the call queue, over each of the plurality of windows; and generating the estimated call waiting time in response to the expected queue length and the incoming call rate.

11. The method of claim 10 wherein the incoming call rate is determined by the steps of:

selecting a sample window size for sampling call statistics;

determining an incoming call count over the sample window size; and dividing the incoming call count by the first sample window size.

12. The method of claim 11 wherein the expected queue length is determined by the steps of:

determining a quantity of call samples made in the sample window;

determining an accumulated queue length over the sample window; and dividing the accumulated queue length by the quantity of call samples.

13. A method for determining a dynamic sample window size for generating an expected call waiting time in a call center queue, the method comprising the steps of:

determining a minimum call sample size;

selecting a minimum sample window size;

selecting a maximum sample window size;

selecting a sample window size increment value;

setting a current sample window size to the minimum sample window size;

determining an incoming call count within the current sample window size;

if the incoming call count is equal to or greater than the minimum call sample size, determining the call expected waiting time in response to an accumulative queue length, the incoming call count, and a number of samples;

if the incoming call count is less than the minimum sample size, incrementing the current sample window size by the sample window size increment value to produce an incremented sample window size;

if the incremented sample window size is less than or equal to the maximum window size, setting the current window size to the incremented window size; and if the incremented sample window size is greater than the maximum sample window size, determining the call expected waiting time in response to the accumulative queue length, the incoming call, and the number of samples.

14. The method of claim 13 and further including the steps of:

if the first incremented sample window size is less than or equal to the maximum sample window size, determining a waiting call count within the first incremented sample window size;

if the waiting call count is less than the minimum sample size, incrementing the first incremented sample window size by the sample window size increment value to produce a second incremented sample window size; and if the second incremented sample window size is greater than the maximum sample window size, determining a non-zero count of waiting calls in the call center queue and an accumulated queue length.

15. The method of claim 13 and further including the step of generating the estimated call waiting time in response to the non-zero count of waiting calls in the call center queue and the accumulated queue length.

16. The method of claim 13 and further including the step of determining the dynamic sample window size for a plurality of sample windows assigned to the call center queue.

17. A call center system having the ability to determine an estimated call waiting time for incoming calls to a plurality of agents at the call center, each agent processing the incoming calls through a call queue assigned to each agent, the call center system comprising:

a private branch exchange coupled to a public switched telephone network, the private branch exchange switching each of the incoming calls to an appropriate agent's call queue; and a call center server, coupled to the private branch exchange, the call center server controlling the routing of calls by the private branch exchange to each agent's call queue, the call center server comprising:

means for determining an instantaneous call count in the call queue;

means for generating a sample window over which call samples are obtained;

means for varying the size of the sample window in response to a change in frequency of calls made to the call center;

means for determining the number of calls served by the agent during the sample window; and means for generating an estimated call waiting time in response to the instantaneous call count and the number of calls served during the predetermine time.

18. The system of claim 17 wherein the call center server further comprises means for announcing the estimated call waiting time to each call in the agent's call queue.

19. The system of claim 17 and further including an interactive voice response server coupled to the private branch exchange, the interactive voice response server generating queries that are announced to a caller in order to properly route the incoming calls.

20. The system of claim 17 wherein the agents are divided up into multiple skill sets and at least one call queue is assigned to each skill set of the multiple skill sets.

21. The system of claim 17 wherein the call center server is coupled to the private branch exchange over a local area network.

22. A call center server apparatus for controlling the routing of calls by a private branch exchange to an agent's call queue, the call center server comprising:

means for determining an instantaneous call count in the call queue;

means for generating a sample window over which call samples are obtained;

means for varying the size of the sample window in response to a change in frequency of calls made to the call center;

means for determining the number of calls served by the agent during the sample window; and means for generating an estimated call waiting time in response to the instantaneous call count and the number of calls served during the predetermine time.

* * * * *